United States Patent [19]
Eisen et al.

[11] Patent Number: 5,983,343
[45] Date of Patent: Nov. 9, 1999

[54] DATA PROCESSING SYSTEM HAVING AN APPARATUS FOR DE-SERIALIZED STATUS REGISTER OPERATION AND METHOD THEREFOR

[75] Inventors: Susan Elizabeth Eisen, Austin; James Edward Phillips, Round Rock, both of Tex.

[73] Assignee: International Business Machines Corporation, Armonk, N.Y.

[21] Appl. No.: 09/024,927

[22] Filed: Feb. 17, 1998

[51] Int. Cl.$^6$ .................. G06F 9/38; G06F 9/30
[52] U.S. Cl. .............. 712/237; 712/215; 712/207; 711/137; 711/144; 711/145
[58] Field of Search .................. 395/394, 393, 395/582, 374, 591, 709, 800.73; 711/126, 507, 137, 144; 712/219, 23, 217, 235, 223, 231, 237

[56] References Cited

U.S. PATENT DOCUMENTS

| | | | |
|---|---|---|---|
| 5,463,745 | 10/1995 | Vidwans et al. | 395/374 |
| 5,511,172 | 4/1996 | Kimura et al. | 395/382 |
| 5,524,224 | 6/1996 | Denman et al. | 395/395 |

OTHER PUBLICATIONS

Edited by Cathy May, Ed Silha, Rick Simpson, Hank Warren, *The PowerPC Architecture: A Specification for a New Family of RISC Processors*, International Business Machines Incorporated, pp. 137–141, 193–196.

*Primary Examiner*—Daniel H. Pan
*Attorney, Agent, or Firm*—Barry S. Newberger; Winstead Sechrest & Minick P.C.; Anthony V. S. England

[57] ABSTRACT

An FPSCR (Floating Point Status and Control Register) mechanism supports de-serialized floating point unit (FPU) instruction execution. The FPSCR mechanism provides for speculative execution of all FPU instructions. In particular, instructions that directly alter FPSCR data values may be executed speculatively. Instructions of this type which may be de-serialized include the move-from FPSCR instruction, the move-to-condition register from FPSCR instruction, the move-to FPSCR field immediate instruction, the move-to FPSCR field instruction, the move-to FPSCR bit 0 instruction, the move-to FPSCR bit 1 instruction, as well as FPU register-to-register instructions having a recording bit set. Speculative execution is implemented by providing an accurate working FPSCR at the time the speculatively executing instruction sources FPSCR data. Moreover, the FPSCR mechanism re-establishes the working FPSCR when exceptions occur, or speculative execution is cancelled. The FPSCR de-serialization mechanism is compatible with prior art out-of-order FPU register-to-register instruction execution. By implementing each of these functions, the FPSCR mechanism permits the out-of-order execution of eligible floating point unit instructions.

23 Claims, 8 Drawing Sheets

DATA PROCESSING SYSTEM HAVING AN APPARATUS FOR DE-SERIALIZED STATUS REGISTER OPERATION AND METHOD THEREFOR

CROSS-REFERENCE TO RELATED APPLICATIONS

The present invention is related to U.S. patent application Ser. No. 08/935,939, which is hereby incorporated herein by reference.

TECHNICAL FIELD

The present invention relates in general to a data processing system, and in particular, to a data processing system performing out-of-order execution.

BACKGROUND INFORMATION

As computers have been developed to perform a greater number of instructions at greater speeds, many types of architectures have been developed to optimize this process. For example, a reduced instruction set computer (RISC) device utilizes fewer instructions and greater parallelism in executing those instructions to ensure that computational results will be available more quickly than the results provided by more traditional data processing systems. In addition to providing increasingly parallel execution of instructions, some data processing systems implement out-of-order instruction execution to increase processor performance. Out-of-order instruction execution increases processor performance by dynamically allowing instructions dispatched with no data dependencies to execute before previous instructions in an instruction stream that have unresolved data dependencies. In some data processing systems, instructions are renamed and instruction sequencing tables, also referred to as re-order buffers, facilitate out-of-order execution by re-ordering instruction execution at instruction completion time.

Re-order buffer devices are also used to allow speculative instruction execution. Therefore, data processing systems which support speculative instruction execution can be adapted for out-of-order execution with the addition of relatively minimal hardware. A portion of this added hardware includes issue logic which is used to determine a time and order that instructions should be issued. Such issue logic can be extremely complex since the dependencies of instructions and a state of a pipeline in which the instructions are being executed must be examined to determine a time at which the instruction should issue. If the issue logic is not properly designed, such issue logic can become a critical path for the data processing system and limit the frequency of instruction execution such that performance gains which could be achieved by out-of-order issue are destroyed.

The out-of-order instruction execution implemented by many prior art systems increases processor performance by dynamically allowing instructions dispatched with no data dependencies to execute before previous instructions in the instruction stream that have unresolved data dependencies. Register file renaming, renaming selected bits of architected facilities such as floating point status and control registers (FPSCR), and instruction sequencing tables (re-order buffers) facilitate out-of-order execution by re-ordering instruction execution at instruction completion time. For more information on such structures, refer to "An Efficient Algorithm for Exploiting Multiple Arithmetic Units," by R. M. Tomasulo, published in *IBM Journal*, January 1967, pp. 25–33. It should be noted that these devices are also used to allow speculative instruction execution. Therefore, system architecture supporting speculative instruction execution can be adapted for out-of-order execution with the addition of relatively "little" hardware and few overhead expenses. Thus, register file renaming may support out-of-order execution without modification from a speculative instruction execution architecture. However, in order to support out-of-order execution of floating point instructions, additional mechanisms have been required. Because the floating point status and control register (FPSCR) associated with the execution of floating point instructions contains a history of prior executing instructions, renaming the FPSCR is inadequate to support out-of-order instruction execution. When an instruction executes out-of-order, results from earlier instructions in an instruction stream are unavailable as partial results are sometimes saved in the rename buffer.

Therefore, mechanisms have been introduced that maintain a history of instruction execution exceptions for each instruction which is finished out-of-order. This allows the architected register to be reproduced and completed as if the instruction had executed in instruction sequence. The exception history from instructions that have previously completed, or are completing in a current cycle are also reordered. In this way, an FPSCR status for sticky exception bits of the FPSCR may be determined. With respect to non-sticky status for the FPSCR, the status is derived from a last instruction completing in a given cycle that modifies this status. Status information is also reported to a re-order buffer which allows interrupts to be posted as if the instructions were executed in an instruction order.

However, this mechanism for out-of-order floating point instruction execution does not allow for the out-of-order execution of a class of floating point instructions. These are instructions that operate on the FPSCR directly, or are register-to-register instructions that alter the condition register, that is, have a recording bit set. These will collectively be called FPSCR instructions. Such instructions, which source the status bits of the FPSCR, must execute "in order" to read the correct status from all prior, with respect to program order, floating point instructions.

To accomplish the sourcing of a correct FPSCR, the execution of FPSCR instructions have been serialized, wherein FPSCR instructions are not issued until all prior, in program order, FPU rr instructions have completed. Such serialization is slow. FPSCR instructions may appear frequently in floating point operations, particularly in an object oriented prograrmning paradigm. Floating point subroutines, usually referred to as methods in the object oriented programming art, must ensure the rounding mode of the operation. Functions are defined to operate in specific floating point rounding modes independently of the rounding mode in the program code calling the function. In order to perform the required rounding mode transactions, multiple FPSCR instructions are executed. Therefore, to improve performance in execution of object oriented software, there is a need in the art for a mechanism to execute FPSCR instructions without serialization, and which is compatible with existing out-of-order floating point execution mechanisms.

SUMMARY OF THE INVENTION

The previously mentioned needs are addressed with the present invention. Accordingly, there is provided, in a first form, a data processing system. The data processing system includes an input circuit for communicating a plurality of instructions and a register for storing status control values. The data processing system also includes a status logic circuit for selectively generating a first plurality of status values in response to the first one of the plurality of instructions. A speculative status logic device is coupled to the status logic circuit to receive the first plurality of status values therefrom, and coupled to the register to receive the status control values. The speculative status logic circuit generates a second plurality of status control values in response to the first plurality of status values and the status control value which are provided to the status logic circuit.

Additionally, there is provided, in a second form, a method operating a data processing system. The method includes the steps of communicating a plurality of instructions and storing a status control value in a register. The method also includes the steps of speculatively generating a first plurality of status values in response to the first one of the plurality of instructions and generating a current status control value in response to the first plurality of status values and the status control value.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides an FPSCR (floating point status and control register) mechanism that supports de-serialized execution of FPSCR instructions. FPSCR instructions are a class of instructions which either directly operate on the FPSCR or are floating point register to register instructions that have a recording bit set. The FPSCR mechanism of the present invention provides for the execution of FPSCR instructions before completion of prior instructions that modify data in the FPSCR. FPSCR instructions execute speculatively, in instruction order. Speculative execution of FPSCR instructions is mediated through the implementation of a working FPSCR. The working FPSCR provides accurate FPSCR data values to the FPSCR instructions at the time they speculatively execute. At other times, the working FPSCR may contain status from a later instruction which has slipped ahead of an earlier instruction, when the earlier instruction executes. Note that the reference to earlier and later refers to instruction order, rather than execution order.

Executing FPSCR instructions in instruction order ensures that the working FPSCR is accurate when it is sourced. Non-FPSCR instructions may execute out-of-order provided that a non-FPSCR instruction is not allowed to slip behind an FPSCR instruction. Furthermore, instructions later in the instruction stream than an FPSCR instruction cannot slip ahead of one of these instructions. Moreover, a move to floating point status control register (MTFPSCR) instruction can update FPSCR control bits. This can alter the behavior of the execution of floating point register-to-register instructions following the MTFPSCR in the instruction stream. For this reason as well, floating point instructions behind an FPSCR instruction cannot be allowed to slip ahead of that instruction.

Within these constraints, out-of-order floating point instruction execution is permitted. Accordingly, the FPSCR mechanism of the present invention is compatible with the mechanism of out-of-order floating point instruction execution described in U.S. patent application Ser. No. 08/935,939 herein incorporated by reference.

Operation of the present invention will subsequently be described in greater detail. Prior to that discussion, however, a description of connectivity of the elements of the present invention will be provided.

Description of Connectivity

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
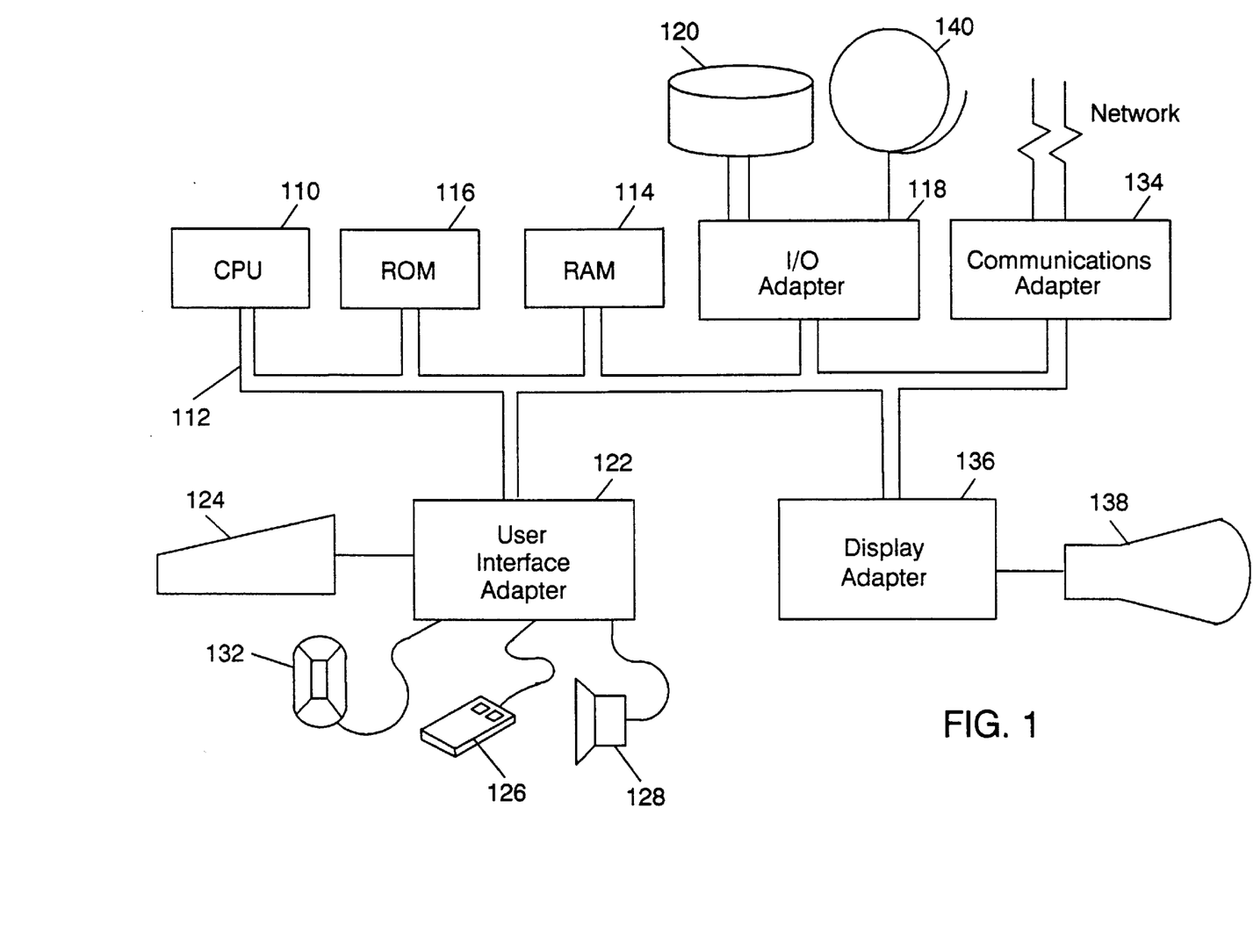
FIG. 1 illustrates, in block diagram form, a data processing system in accordance with one embodiment of the present invention.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The out-of-order FPSCR mechanism of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
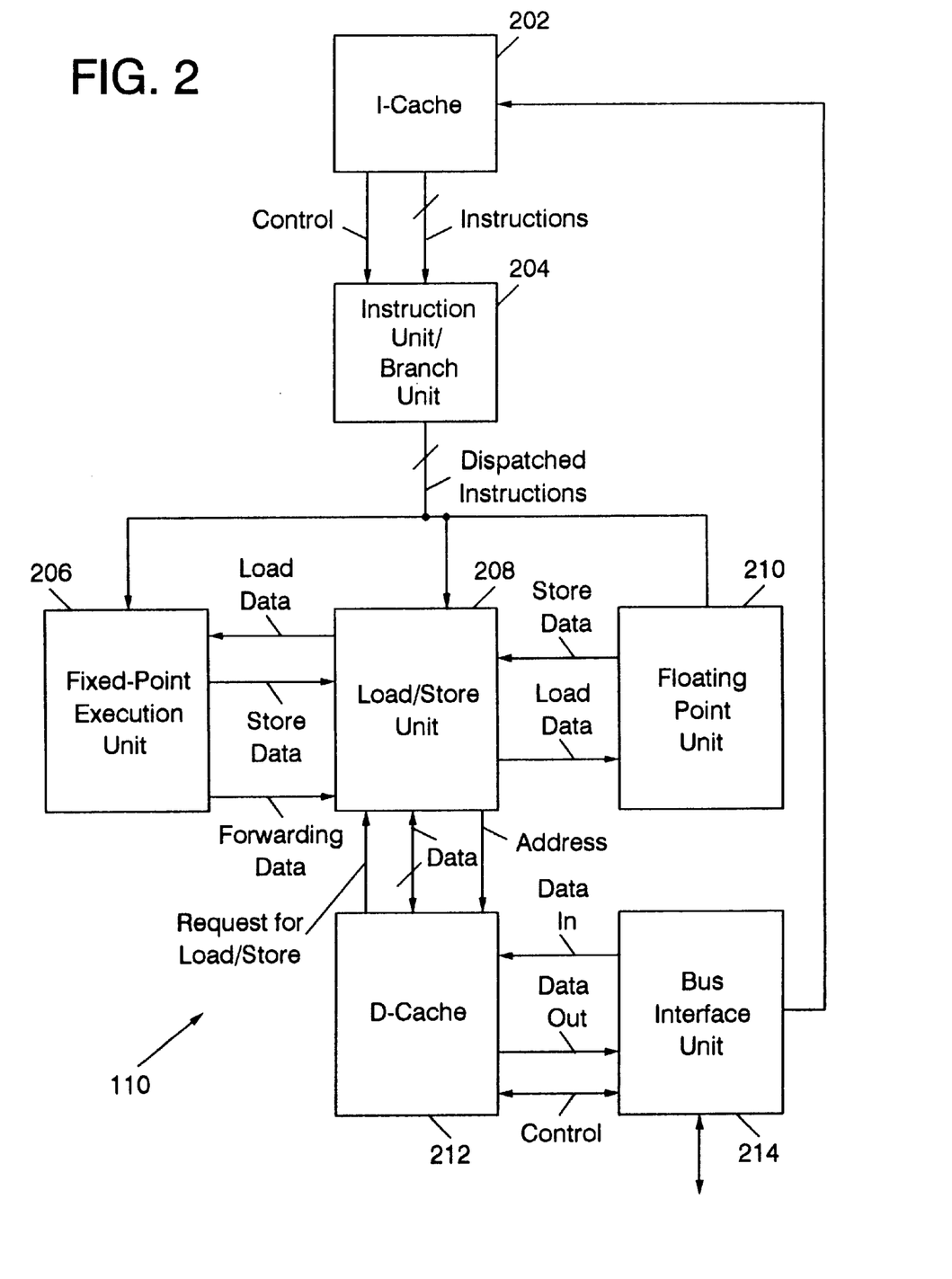
FIG. 2 illustrates, in block diagram form, a central processing unit in accordance with one embodiment of the present invention.

FIG. 2 illustrates a portion of CPU 110 in greater detail. The portion of CPU 110 comprises an instruction cache (I-cache) 202, an instruction unit/branch in unit 204, a fixed point execution unit (FXU) 206, a load/store unit 208, a floating point unit (FPU) 210, a data cache (D-cache) 212, and a bus interface unit (BIU) 214.

I-cache 202 is coupled to instruction unit/branch unit 204 to communicate control information and a plurality of instructions. Instruction unit/branch unit 204 is coupled to each of FXU 206, load/store unit 208, and FPU 210 to provide a plurality of dispatched instructions. I-cache 202 is coupled to bus interface unit 214 to communicate Data and Control information. FXU 206 is coupled to load/store unit 208 to communicate a load data value, a store data value, and a forwarding data value. Load/store unit 208 is coupled to FPU 210 to communicate a store data value and load data value. Load/store unit 208 is also coupled to D-cache 212 to communicate a request for a load/store signal, a plurality of data values, and an address value. D-cache 212 is coupled to bus interface unit 214 to communicate a data in signal, a data out signal, and a control signal.

Figures 3, 3A:
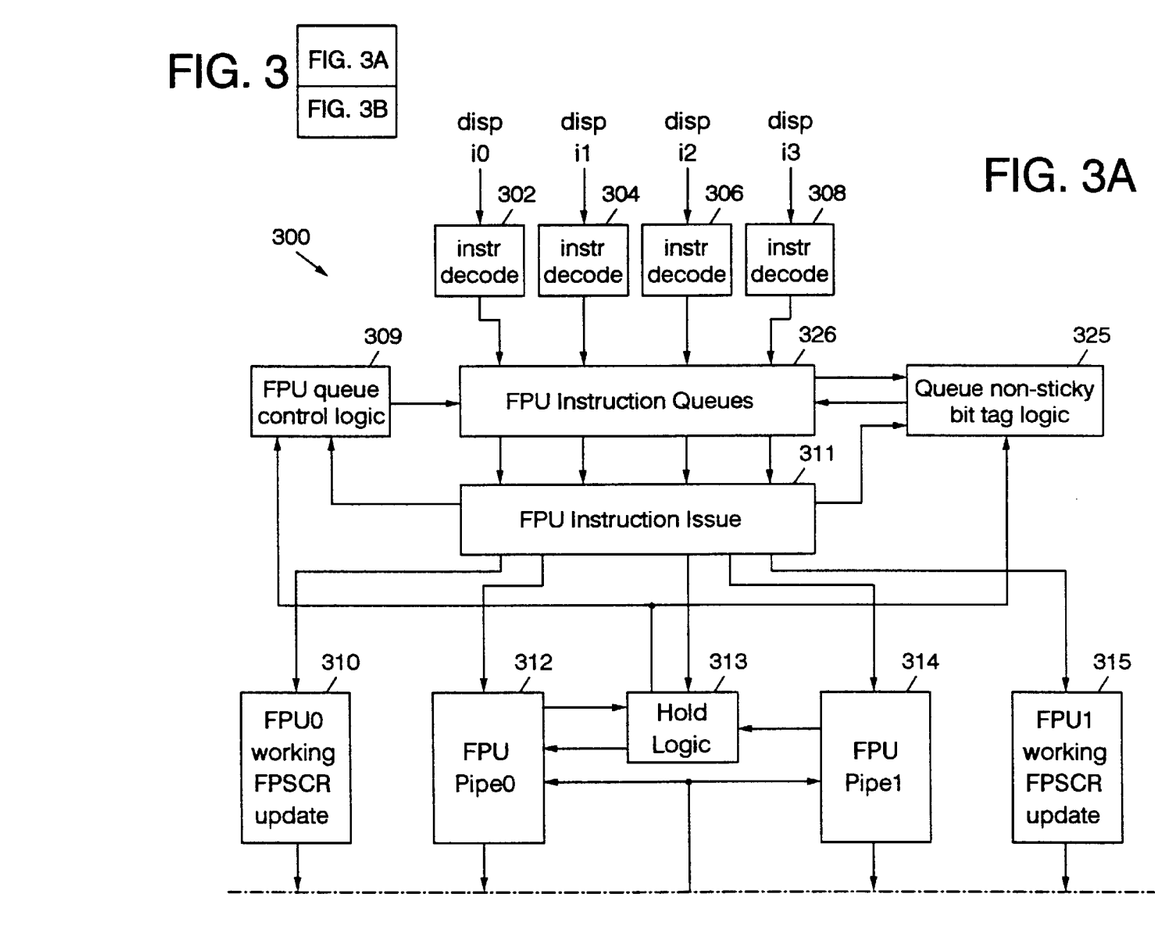
FIGS. 3, 3A, 3B illustrate, in block diagram form, an de-serialized FPSCR mechanism implemented in accordance with one embodiment of the present invention.
Figure 3B:
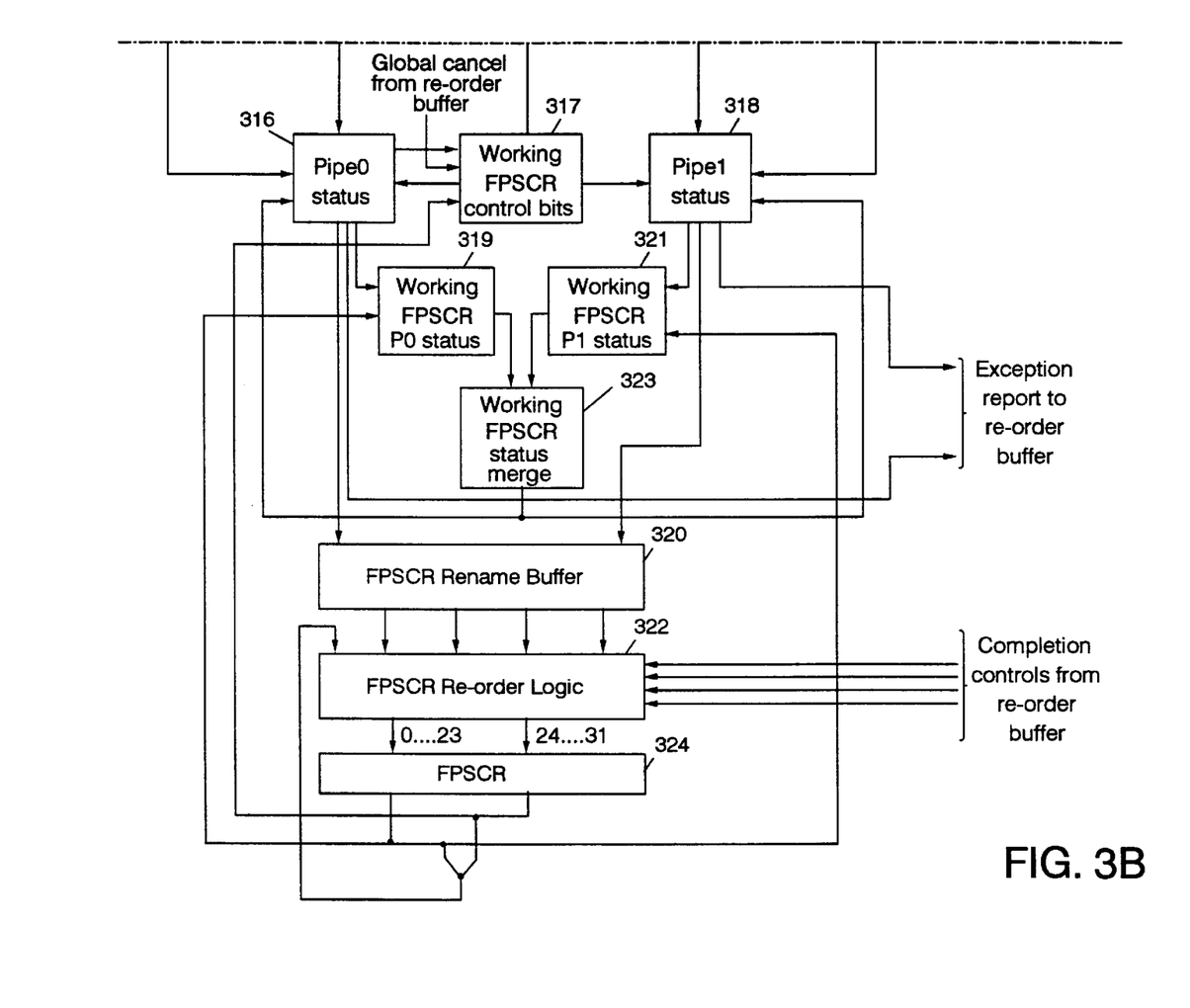

FIG. 3 illustrates an FPSCR mechanism within floating point unit 210 of FIG. 2. FPSCR mechanism 300 comprises an instruction decode circuit 302, an instruction decode circuit 304, an instruction decode circuit 306, an instruction decode circuit 308, FPU queue control logic 309, an FPU0 working FPSCR update circuit 310, an FPU instruction issue logic 311, an FPU pipe0 312, hold logic 313, an FPU pipe1 314, an FPU1 working FPSCR update circuit 315, a pipe0 status circuit 316, a working FPSCR control buffer 317, a pipe1 status circuit 318, a working FPSCR P0 status buffer 319, an FPSCR rename buffer 320, a working FPSCR P1 status buffer 321, an FPSCR re-order logic circuit 322, a working FPSCR status merge logic 323, an FPSCR (floating point status and control register) 324, a non-sticky bit tag logic 325, and a plurality of FPU instruction queues 326.

During operation, a dispatched instruction i0, labeled "disp i0", is provided to instruction decode circuit 302. An output of instruction decode circuit 302 is coupled to the plurality of FPU instruction queues 326. A second dispatched instruction, labeled "disp i1", is provided to instruction decode circuit 304. An output of instruction decode circuit 304 is coupled to the plurality of FPU instruction queues 326. A third dispatched instruction, labeled "disp i2", is provided to an input of instruction decode circuit 306. An output of instruction decode circuit 306 is coupled to the plurality of FPU instruction queues 326. A fourth dispatched instruction, labeled "disp i3", is provided to an input of instruction decode circuit 308. An output of instruction decode circuit 308 is coupled to the plurality of FPU instruction queues 326. An output of the plurality of FPU instruction queues 326 is coupled to FPU instruction issue logic 311. An output of FPU instruction issue logic 311 is coupled to FPU pipe0 312. Additionally, a second output of FPU instruction issue logic 311 is coupled to FPU pipe1 314. Third and fourth outputs of FPU instruction issue logic 311 are coupled to FPU0 working FPSCR update logic 310 and FPU1 working FPSCR update logic 315. An output of FPU0 working FPSCR update logic 310 is coupled to pipe0 status circuit 316. An output of FPU1 working FPSCR update logic 315 is coupled to pipe1 status circuit 318. An output of FPU pipe0 312 is coupled to pipe0 status circuit 316. An output of FPU pipe1 314 is coupled to pipe1 status circuit 318. A second output of FPU pipe0 312 is coupled to hold logic 313, and a second output of FPU pipe1 314 also is coupled to hold logic 313. A first output of hold logic 313 is coupled to FPU pipe0 312, and a second output of hold logic 313 is provided to FPU control logic 309, and to non-sticky bit tag logic 325. FPU queue control logic 309 and non-sticky bit tag logic 325 receive a fifth and sixth output from FPU issue logic 311. Non-sticky bit tag logic receives a signal from FPU instruction queue 326. FPU instruction queue 326 receives an output from FPU queue control logic 309. An output of pipe 1 status circuit 318 provides a first exception report signal to a re-order buffer (not illustrated in detail herein) within issue unit/branch unit 204. An output of pipe 1 status circuit 318 is also coupled to FPSCR rename buffer 320. An output of pipe 0 status circuit 316 provides a second exception report signal to a re-order buffer (not illustrated in detail herein). Additionally, a first output of pipe 0 status circuit 316 is coupled to FPSCR rename buffer 320, and a second output of pipe 0 status circuit is coupled to working FPSCR control buffer 317. Working FPSCR control buffer 317 receives a global cancel signal from the re-order buffer (not illustrated in detail herein) signalling FPSCR mechanism 300 to cancel speculative execution. First and second outputs of working FPSCR control buffer 317 are coupled to pipe 0 status circuit 316 and pipe 1 status circuit 318, respectively. A third output of working FPSCR control buffer is connected to FPU pipe 0 312 and FPU pipe 1 314. FPSCR rename buffer 320 is coupled to FPSCR re-order logic circuit 322 to provide a plurality of outputs. FPSCR re-order logic 322 receives a plurality of completion control signals from a re-order buffer (not illustrated in detail herein). FPSCR re-order logic circuit 322 is coupled, by a first output, to FPSCR 324 to provide a first plurality of bits thereto. Additionally, a second output of FPSCR re-order logic 322 is coupled to FPSCR 324 and provides bits 24 through 31 at a value stored therein. It should be noted that fewer bits or more bits may also be stored within FPSCR 324. A first output of FPSCR 324 is coupled to working FPSCR control buffer 317, and may include bits 24 through 31 in FPSCR 324.

A second output of FPSCR 324 which may include bits 0–23 is provided to working FPSCR P0 status buffer 319 and working FPSCR P1 status buffer 321. Outputs from each of working FPSCR P0 status buffer 319 and working FPSCR P1 status buffer 321 are sent to working FPSCR status merge logic 323. An output of working FPSCR status merge logic 323 is connected to pipe 0 status circuit 316 and pipe1 status circuit 318. Additionally, working FPSCR P0 status buffer 319 receives a third output from pipe0 status circuit 316, and working FPSCR P1 status buffer 321 receives a second output from pipe1 status circuit 318. The first and second outputs of FPSCR 324 together are provide to FPSCR re-order logic circuit 322.

Figures 4, 4B:
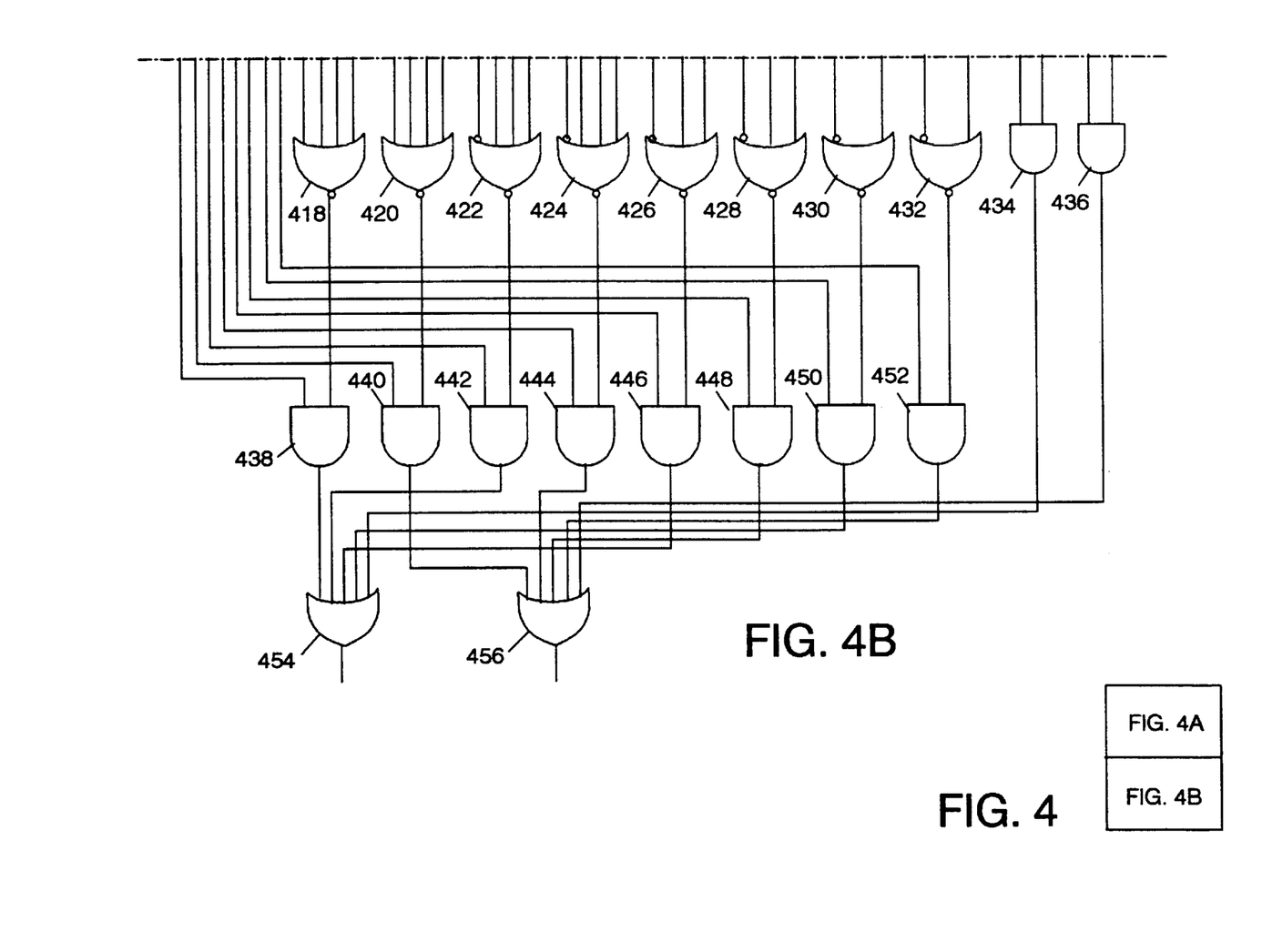
FIGS. 4, 4A, 4B illustrate, in partial block diagram form, an FPSCR re-order logic circuit in accordance with one embodiment of the present invention.
Figure 4A:
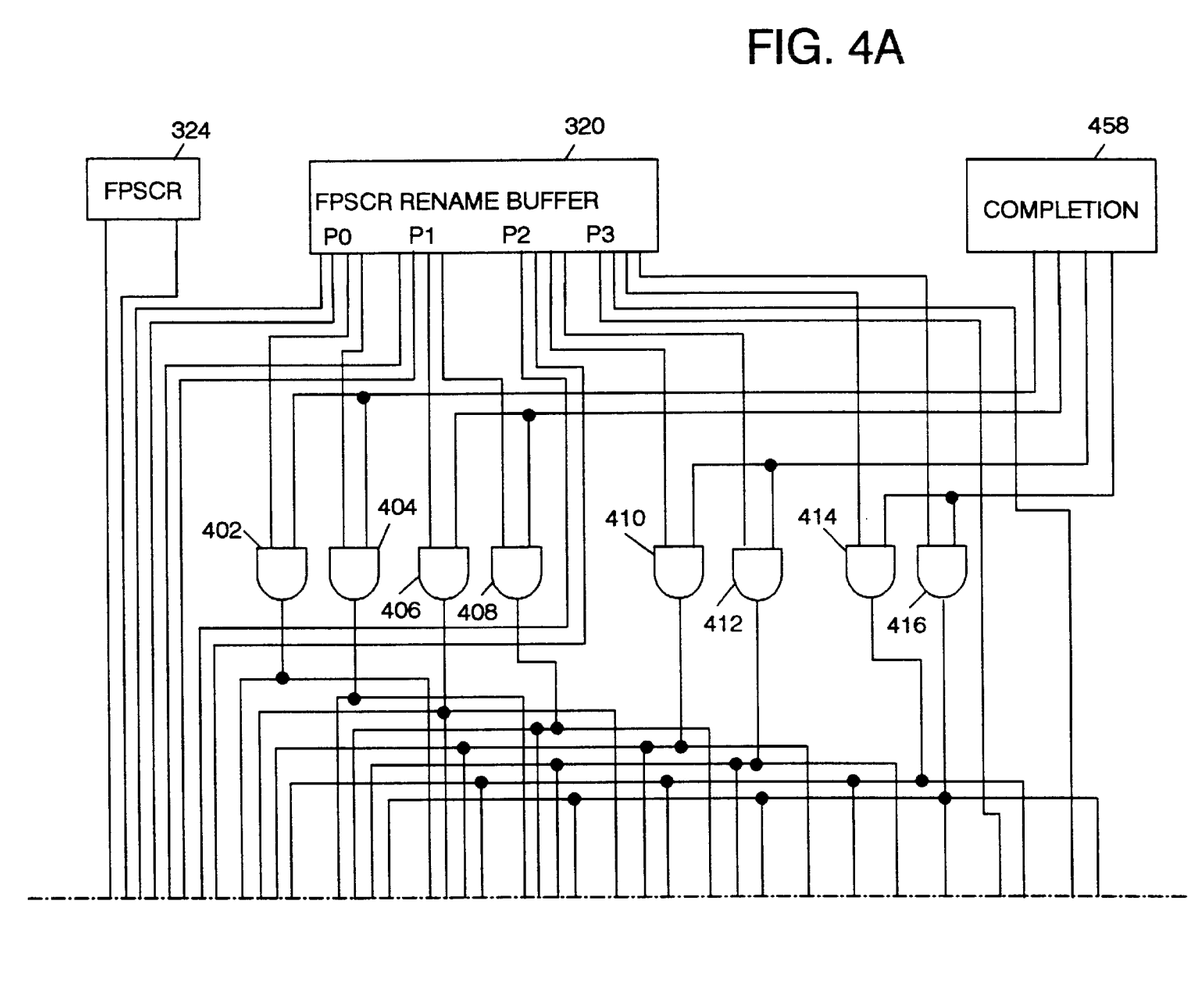

FIG. 4 illustrates an embodiment of FPSCR re-order logic 322 for non-sticky bits. FPSCR re-order logic 322 has been discussed in detail in association with out-of-order FPU register-to-register instruction execution in U.S. patent application Ser. No. 08/935,939, incorporated herein by reference. In FIG. 4, FPSCR re-order logic circuit 322 comprises a plurality of AND gates 402–416, a plurality of NOR gates 418–432, a plurality of AND gates 434–452, an OR gate 454, and an OR gate 456. An output of FPSCR 324 is coupled to an input of each of AND gates 438 and 440. Associated with each of port 0 through port 3 of FPSCR rename buffer 320 are four signals, wherein two signals represent control values and two signals represent two classes of non-sticky status values. Each class of non-sticky status values comprises a plurality of non-sticky status bits. The two control values represent controls for each of the two non-sticky status classes. Each control signal indicates that a completing instruction altered a corresponding non-sticky class when the control signal is asserted. A port 0 (P0) non-sticky first class control signal provided from FPSCR rename buffer 320 is provided to an input of AND gate 402 with a second port 0 non-sticky second class control signal provided as an input of AND gate 404. Additionally, a port 0 first class plurality of non-sticky bits are provided as an input of AND gate 442 and a port 0 second class plurality of non-sticky bits are provided as input to AND gate 444. Port 1 (P1) non-sticky class control signals are provided by FPSCR rename buffer 320 to an input of AND gate 406 and an input of AND gate 408. Port 1 non-sticky status bits are provided as an input of AND gate 446 and an input of AND gate 448. Port 2 (P2) non-sticky class control signals are provided by FPSCR rename buffer 320 is provided to an input of AND gate 410 and an input of AND gate 412. Port 2 non-sticky bits are provided as an input of AND gate 450 and an input of AND gate 452. Port 3 (P3) non-sticky class control signals are provided by FPSCR rename buffer 320 is coupled to an input of AND gate 414 and an input of AND gate 416. Port 3 non-sticky status bits are provided as an input of AND gate 434 and an input of AND gate 436. Completion circuit 458 provides a first completion signal to AND gates 402 and 404. Completion circuit 458 provides a second completion signal to inputs of AND gate 406 and 408. Completion circuit 458 provides a third completion signal to inputs of AND gates 410 and 412. Completion circuit 458 provides a fourth completion signal to inputs of AND gates 414 and 416.

An output of AND gate 402 is coupled to an input of NOR gate 418 and an inverted input of NOR gate 422. An output of AND gate 404 is coupled to an input of NOR gate 420 and an inverted input of NOR gate 424. An output of AND gate 406 is coupled to an input of NOR gate 418, an input of NOR gate 422, and an inverted input of NOR gate 426. An output of AND gate 408 is coupled to an input of NOR gate 420, an input of NOR gate 424, and an inverted input of NOR gate 428. An output of AND gate 410 is coupled to an input of NOR gate 426, an input of NOR gate 422, an input of NOR gate 418, and an inverted input of NOR gate 430. An output of AND gate 412 is coupled to an input of NOR gate 428, an input of NOR gate 424, an input of NOR gate 420, and an inverted input of NOR gate 432. An output of AND gate 414 is coupled to an input of NOR gate 430, an input of NOR gate 426, an input of NOR gate 422, an input of NOR gate 418, and an input of AND gate 434. An output of AND gate 416 is coupled to an input of NOR gate 432, an input of NOR gate 428, an input of NOR gate 424, an input of NOR gate 420, and an input of AND gate 436.

An output of NOR gate 418 is coupled to an input of AND gate 438, an output of AND gate 438 is coupled to an input of OR gate 454. An output of NOR gate 420 is coupled to an input of AND gate 440. An output of AND gate 440 is coupled to an input of OR gate 456. An output of NOR gate 422 is coupled to an input of AND gate 442. An output of AND gate 442 is coupled to an input of OR gate 454. An output of NOR gate 424 is coupled to an input of AND gate 444. An output of AND gate 444 is coupled to an input of OR gate 456. An output of NOR gate 426 is coupled to an input of AND gate 446. An output of AND gate 446 is coupled to an input of OR gate 454. An output of NOR gate 428 is coupled to an input of AND gate 448. An output of AND gate 448 is coupled to an input of OR gate 456. An output of NOR gate 430 is coupled to an input of AND gate 450. An output of AND gate 450 is coupled to an input of OR gate 454. An output of NOR gate 432 is coupled to an input of AND gate 452. An output of AND gate 452 is coupled to OR gate 456. An output of AND gate 434 is coupled to an input of OR gate 454. An output of AND gate 436 is coupled to an input of OR gate 456.

Figures 5, 5A:
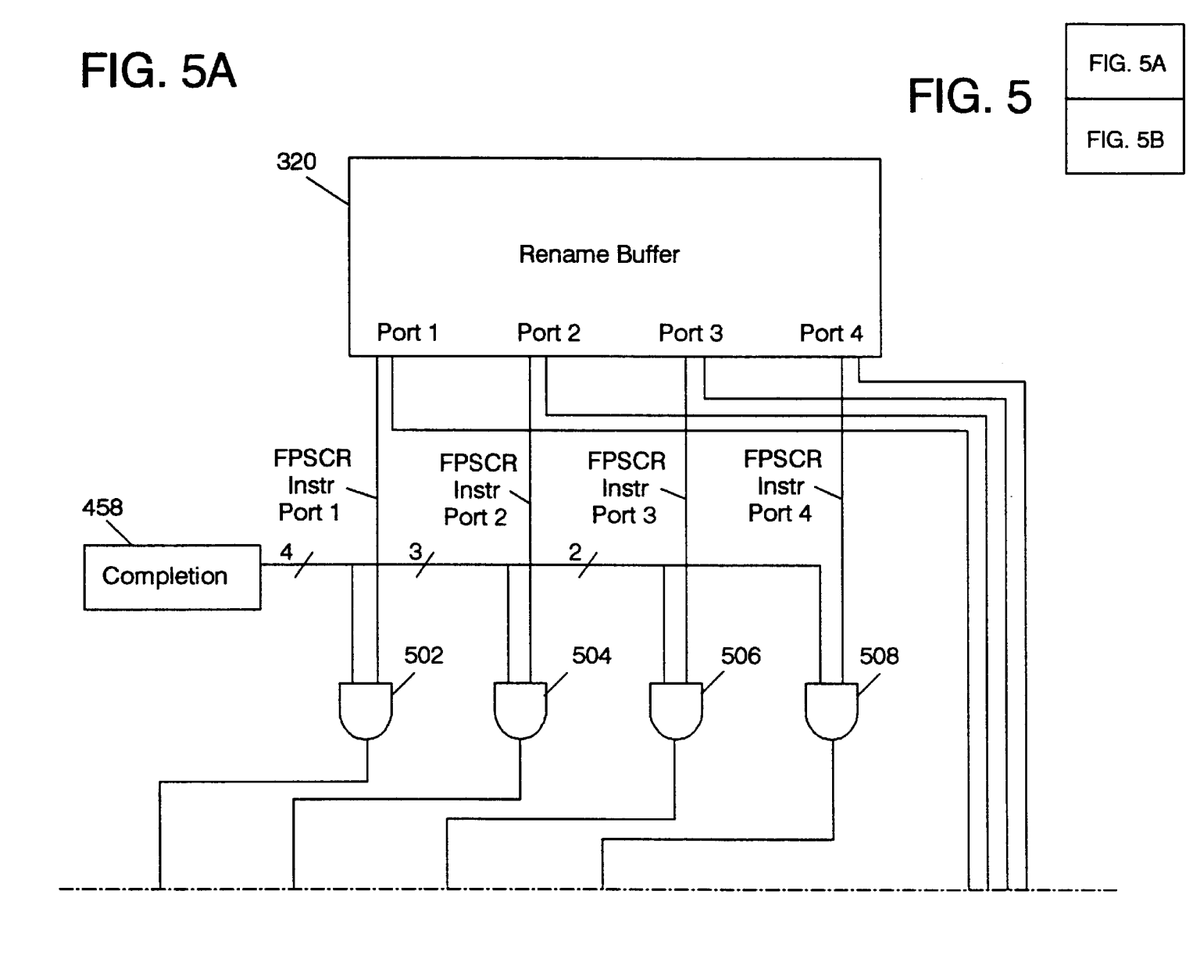
FIGS. 5, 5A, 5B illustrate, in partial block diagram form, an FPSCR re-order logic circuit for sticky bits in accordance with an embodiment of the present invention.
Figure 5B:
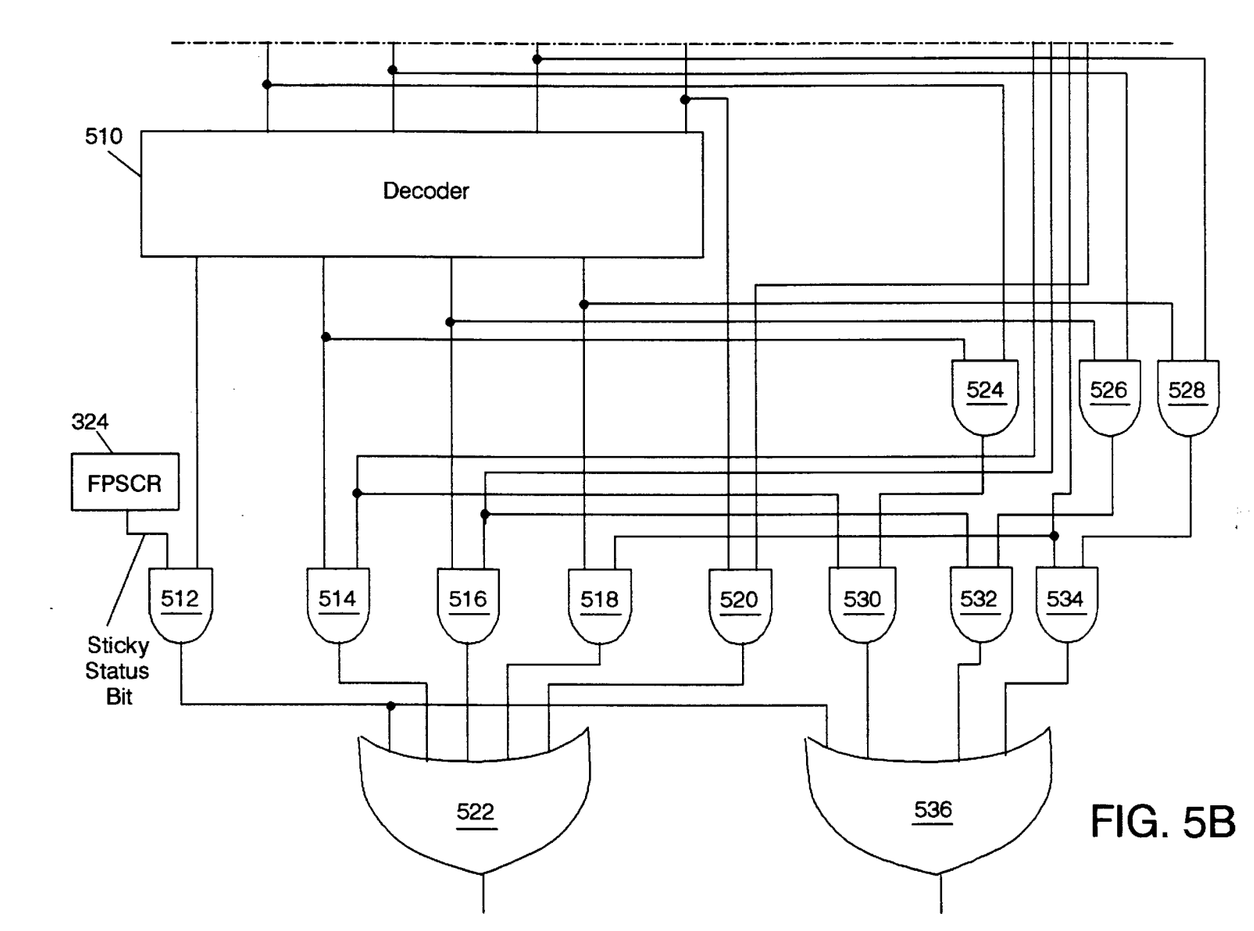

FIG. 5 illustrates an embodiment of FPSCR re-order logic 322 for sticky bits. In FIG. 5, sticky bit FPSCR re-order logic circuit 322 comprises a plurality of AND gates 502–508, decoder 510, a plurality of AND gates 512–520, OR gate 522, a plurality of AND gates 524–528, a plurality of AND gates 530–534, and OR gate 536. Associated with each of port 1–port 4 of rename buffer 320 are a pair of signals. One signal, FPSCR INSTR, is set if the instruction corresponding to the port is an FPSCR instruction that can set an FPSCR bit. The other signal is the sticky status value corresponding to the instruction in the respective port. The FPSCR INSTR signal from port 1 is provided to an input of AND gate 502, the FPSCR INSTR signal from port 2 is provided to an input of AND gate 504, the FPSCR INSTR signal from port 3 to an input of AND gate 506 and the FPSCR INSTR from port 4 to an input of AND gate 508. A second input of each of AND gates 502–508 receives one of the four completion control signals from completion unit 458. The output of AND gate 502 is provided to a first input of decoder 510. An output of AND gate 504 is coupled to a second input of decoder 510, an output of AND gate 506 to a third input of decoder 510, and an output of AND gate 508 to a fourth input of decoder 510. The outputs of AND gate 502–506 are also coupled to an input of AND gates 524–528, respectively. A first output of decoder 510 is provided to an input of AND gate 512. A second input of AND gate 512 also receives a sticky status bit from FPSCR 324. A second output of decoder 510 is coupled to an input of AND gate 514. A second input of AND gate 514 receives the sticky status from port 1 of rename buffer 320. An input of AND gate 516 is coupled to a third output of decoder 510. A second input of AND gate 516 is coupled to the sticky status of port 2 in rename buffer 320. First and second inputs of AND gate 518 are coupled to a fourth output of decoder 510, and the sticky status of port 3 in rename buffer 320, respectively. An input of AND gate 520 is coupled to the output of AND gate 508, and a second input of AND gate 520 is coupled to the sticky status of port 4 in rename buffer 320. The outputs of AND gates 512–520 are each coupled to an input of OR gate 522. The re-ordered sticky bit appears at the output of OR gate 522. A second input of each of AND gates 524, 526, and 528 is coupled to the second, third, and fourth outputs of decoder 510, respectively. An output of AND gate 524 is coupled to an input of AND gate 530. A second input of AND gate 530 is coupled to the sticky bit of port 1 in rename buffer 320. AND gate 532 is coupled to the output of AND gate 526 at a first input, and a second input of AND gate 532 is coupled to the sticky bit at port 2 in rename buffer 320. An input of AND gate 532 is coupled to an output of AND gate 528. A second input of AND gate 534 is coupled to the sticky bit at port 3 in rename buffer 320. An input of OR gate 536 is coupled to the output of AND gate 512. Three additional inputs of OR gate 536 are coupled to outputs of AND gate 530, 532, and 534, respectively. A sticky status reference bit appears at the output of OR gate 536.

The text provided above has described the connectivity of the present invention. Description of the present will subsequently be provided in greater detail.

Description of Operation

FIG. 1 illustrates a data processing system 100 which implements one embodiment of the present invention. It should be noted that the present invention is implemented in a portion of CPU 110 and is used to provide data and control information to a remaining portion of data processing system 100.

FIG. 2 illustrates the portion of CPU 110 in greater detail. During operation of one embodiment of the present invention, instructions are fetched from I-cache 202 and provided to instruction unit/branch unit 204 with the appropriate control signals for their execution. Within instruction unit/branch unit 204, the instructions provided by I-cache 202 are stored in registers. Specifically, there are four dispatch registers (not illustrated herein) in one embodiment of the present invention. Each of these four dispatched registers is accessed and four instructions are dispatched in a single cycle therefrom. Furthermore, each of the four dispatch registers include an instruction part, an instruction pre-decode part, and an instruction valid part. It should be noted that any number of dispatch registers may be implemented in the present invention with a corresponding modification in a remaining portion of the logic in the data processing system. Additionally, it should be recognized that the dispatch register may include different portions than those previously outlined herein.

As previously mentioned, the dispatch registers included in instruction unit/branch unit 204 include a pre-decode mechanism. This mechanism provides partially decoded information describing an instruction type and target information to facilitate the speedy determination of instruction characteristics. Furthermore, an instruction valid portion of the dispatch registers indicates that an instruction stored within a dispatch register is valid and may be accessed to perform a correct computing function. Information about each of the instructions is transferred to an appropriate one of FXU 206, load/store unit 208, and FPU 210 via the dispatched instructions.

CPU 110 of the present invention dispatches four instructions and completes four instructions in each timing cycle. Furthermore, CPU 110 implements register renaming of all targets of floating point instructions executed therein. Additionally, FPU 210 of CPU 110 implements two independent floating point pipelines (FPU pipe0 312 and FPU pipe1 314 of FIG. 3), wherein only one pipe supports the execution of certain instructions. These instructions include a move-to-FPSCR instruction, a move-from-FPSCR instruction, and fpu rr instructions having a recording bit set. This subset of FPU instructions have been collectively described as FPSCR instructions, and will hereinafter be so described when referred to in the aggregate. Assume in one embodiment of the invention that only FPU pipe0 312 supports the execution of the FPSCR instructions. It should be noted that move-to-FPSCR instructions engage each of the bits of FPSCR 324 to be set or reset under instruction control. This is different than implementations which set an FPSCR to indicate the status of an operation. Move-from-FPSCR instructions allow FPSCR 324 to be read into an FPR for later storage into memory or for observation. Additionally, an fpu rr instruction allows a floating point rr-type instruction to set a condition register with an exception status of the operation or an indication of a result. For additional information on each of these types of instructions, refer to, "*The Power PC™ Architecture: A Specification for a New Family of Risk Processors*," edited by Cathy May, et al, published by Morgan Kaufmann Publishers, Inc., Chapter 4.6, Page 193 through 196, which is hereby incorporated by reference herein.

Furthermore, assume that FPU 210 has a pipeline which has the following form:

| if | dr | e0 | e1 | e2 | e3 | wb | fi | cp | wv | pr | cb. |

In the aforementioned pipeline, the terms described therein are defined as follows:

if=instruction fetch (hidden)
dr=instruction dispatch/register rename
e0=operand fetch
e1=execute 1 stage
e2=execute 2 stage
e3=execute 3 stage
wb=write result to rename buffer (hidden)
fi=finish (hidden)
cp=complete (hidden)
wv=write back vector to fpr (hidden)
pr=prioritize fpr right (hidden)
cb=copy from rename buffer to fpr (hidden).

Assume that an instruction sequence executing within FPU 210 executes two instructions within the pipeline described above. If one of the operands of the second instruction provided to the pipeline is dependent upon an operand of the first instruction provided to the pipeline, a timing diagram for the first instruction (i0) and the second instruction (i1) follows:

| instruction i0 | if | dr | e0 | e1 | e2 | e3 | wb |
| instruction i1 | if | dr | e0 | e0 | e0 | e0 | e1 | e2 | e3 | wb. |

Furthermore, in some situations where a preselected operand is dependent upon a result of a first instruction being executed by the pipeline, the pipeline will have the following timing diagram for the first instruction i0 and the second instruction i1:

| instruction i0 | if | dr | e0 | e1 | e2 | e3 | wb |
| instruction i1 | if | dr | e0 | e0 | e0 | e0 | e0 | e1 | e2 | e3 | wb. |

As the present invention resides in FPU 210 in one embodiment of the present invention, operation of FPU 210 will subsequently be described in greater detail.

Furthermore, within CPU 110, each of the functional units is buffered with instruction queues. The instruction queues for floating point instructions reside within the floating point unit (FPU) 210. It should be noted that each functional unit receives instructions from the dispatch register and stages the instructions in the instruction queue from which queue instructions are scheduled for issue to the pipelines. Issue unit/branch unit 204 signals I-cache 202 when the queue is full and can no longer accept instructions to be dispatched.

Within FPU 210, any two instructions may be issued from the bottom four queue positions to either of the two previously disclosed FPU pipes (FPU pipe0 312 and FPU pipe1 314 of FIG. 3). It should be noted, however, that certain instructions may only be issued to a designated FPU pipe. Such instructions include FPSCR instructions. These instructions were previously described in greater detail.

The present invention implements an FPSCR mechanism which supports speculative execution of FPSCR instructions. The FPSCR mechanism of the present invention is compatible with out-of-order FPU instruction execution according to the principles of the invention disclosed in U.S. patent application Ser. No. 08/935,939 which is incorporated hereby by reference.

Speculative execution of FPSCR instructions requires that an accurate speculative working FPSCR be provided at the time the instructions sources the working FPSCR.

With respect to providing an accurate speculative copy of a working FPSCR to the FPSCR instructions, the bits within the FPSCR are divided into four categories. First, the FPSCR contains sticky status bits. A sticky status bit is a bit which stays set until an instruction implemented by the external user determines that the bit is no longer required to be set. Sticky status bits are reset by executing MTFPSCR instructions. Providing an accurate FPSCR to the FPSCR instructions for sticky status bits consists of providing a logical OR of the sticky status resulting from the execution of every instruction that executes between the execution of a first FPSCR instruction and the execution of a second FPSCR instruction.

The second type of FPSCR bit is the set of control bits that specify controlling information such as the rounding mode of FPU instructions and the exception enables. These bits are only altered by an MTFPSCR instruction. The working FPSCR provides an accurate copy of these bits to an MTFPSCR instruction upon its execution. At execution, the MTFPSCR sources the control bits in the working FPSCR, and sets or resets the bits according to the requirements of the software program generating the instruction.

The third type of FPSCR bit is a summary bit of sticky status bits. With accurate control bits and sticky status bits in a working FPSCR, calculation of the summary bits is performed by logic circuitry known in the art.

The fourth type of FPSCR bit constitute the non-sticky status bits. These bits are set according to the execution of a particular instruction, or otherwise left unchanged. Within the class of non-sticky status bits, out-of-order execution of FPU instructions is facilitated by separating non-sticky status bits into two categories. This has previously been discussed in U.S. patent application Ser. No. 08/935,939, incorporated herein by reference. Associated with the categorization of the non-sticky status bits, are two tags, update-FRFIC and update-FPCC which are set depending on whether an FPU instruction updates the FR, FI, and C bits of the FPSCR or the FPCC bits of the FPSCR, respectively. These tags are piped along with the corresponding instruction. In the present invention, these tags are generated from "don't write" bits maintained in the instruction queue corresponding to each of the two categories of non-sticky bits, the corresponding class of non-sticky status bits also maintained in the queue, and the instruction order as determined from the queue position. The "don't write" bits are set when an instruction is slipped around a previous instruction in the queue. If the "don't write" bit is not set, and the corresponding non-sticky class is set (indicating the instruction modifies this class of non-sticky bit), then an update bit is set and piped with the corresponding instructions to inform the working FPSCR to update these bits from the instruction's execution.

However, two FPU instructions that alter the same non-sticky bit category may be simultaneously issued, one to each of the independent pipes. In particular, if the issue mechanism is biased to efficiently issue dependent instructions to pipes that are clearing the dependency for "fast forwarding" of the results, program order for the concurrently issued instructions is lost. That is, without "fast forwarding," the first instruction is issued to a first pipe, and then a dependent instruction, one dependent upon a prior issued and executing instruction, is concurrently issued to a second pipe, and program order is maintained "geometrically." However, the dependent instruction might be able to resolve its dependency early if it were issued to the same pipe executing the instruction upon which it is dependent. If such an instruction is executing in pipe 0, for example, then it may be advantageous also to issue a dependent instruction which is later in program order to pipe0, while an earlier instruction in program order is issued to pipe1, to allow for "fast forwarding." In this case, the "geometric" preservation of the program order is lost. Therefore, the issue mechanism of the present invention determines the program order of the instructions at issue time, consolidates the program order with the "don't write" from the queue to create the "update" bits which are piped along with the instruction, and used when the working FPSCR is calculated and updated. When the instructions concurrently issued both update the same non-sticky bit category, and neither has set its "don't write" bit, the calculation of the instruction later in program order is written to the working FPSCR, and the calculation of the earlier instruction is suppressed.

Speculative execution of FPSCR instructions according to the principles of the present invention also requires a mechanism to reorder instructions to the architected FPSCR, which is non-speculative, on instruction completion. In an embodiment in which up to four instructions can complete in a single cycle, the FPSCR mechanism of the present invention ensures that FPSCR instructions may complete in any of the four completion slots. For all FPU instructions other than FPSCR instructions, only the status for that instruction's calculation is saved in an FPSCR rename buffer. For FPSCR instructions, an accurate FPSCR is calculated during execution, and is saved in the rename buffer. Summary bits are not saved, because they can be calculated during completion from the saved status bits. Completion control bits consisting of four bits to determine updating of non-sticky status bits and one bit to determine updating the sticky status bits are saved along with status in the rename buffer. The bits to determine non-sticky status include bits specifying whether the two classes of non-sticky status bits are modified by the instruction, with one of those classes broken into two separate bits for finer control. In addition, a fourth bit is required to determine if one group of the non-sticky bits is to be zero'ed. The final bit, used to determine sticky status, is set if the corresponding instruction can reset stick status. This bit will be set for a subset of the FPSCR instructions. Having it set only for this subset is instrumental in achieving architectural compliance for the Floating Point Exception Summary (FX) bit of the FPSCR. Because this subset includes most of the FPSCR instructions, it will be referred to as indicating an FPSCR set instruction. In addition, since the subset of FPSCR bits resetting sticky status can also modify the non-sticky status bits, and the non-sticky status bits are accurately saved in the rename buffer for these instructions, the fifth bit is OR'd with indications that the non-sticky status bit is modified by the instruction, to create the first three completion control bits discussed above. When completing, if an instruction slot indicates that it corresponds to an FPSCR set instruction, information in prior completion slots is ignored. With respect to sticky status, the information from the FPSCR set instruction slot and the sticky status from later instruction slots are OR'd to produce the sticky status. Similarly, the FPSCR control bits are OR'd together to provide the control field in the FPSCR.

The non-sticky status loaded into the architected FPSCR is the non-sticky status from the last completing instruction that sets non-sticky status bits. If no FPSCR instruction occupies a completion slot, then the architected FPSCR bits are OR'd with the corresponding sticky status bits and control bits in the rename buffer to produce the updated architected FPSCR. Finally, the updated FPSCR summary bits are produced by logical operations on the results of the calculation of the sticky bits just described, and exception enables with special consideration given to calculate the FX bit as subsequently described in detail.

When exceptions occur, or a speculatively executed instruction is cancelled, the working FPSCR must be re-established to the state that it would have been in had all instructions, prior to the last completing instruction, been executed, and no following instructions executed. In the FPSCR mechanism of the present invention, this is accomplished by using a cancel signal generated by re-order buffer logic to move the architected FPSCR to the working FPSCR.

Refer now to FIG. 3. FIG. 3 illustrates a portion of a floating point unit 210 which implements the FPSCR mechanism of the present invention. In FIG. 3, instructions issued from instruction cache 202, FIG. 2, are provided to instruction unit/branch unit 204, FIG. 2. Instruction unit/branch unit 204 subsequently provides a plurality of dispatched instructions, including the instructions labeled DISP I0, DISP I1, DISP I2, and DISP I3. Each of instruction decode circuits 302 through 308 decodes an associated one of instructions DISP I0, DISP I1, DISP I2, and DISP I3. Control, and register file address information derived from a decoded instruction are subsequently provided to the plurality of FPU instruction queues 326. Each of instruction decode circuits 302 through 308 determines a classification of each instruction provided to the floating point unit according to a preselected classification, with respect to updating FPSCR 324.

For an example of classification of a plurality of floating point unit instructions, refer to Table 1 below.

TABLE 1

| Instruction | FR | FI | C | FPCC | class |
| --- | --- | --- | --- | --- | --- |
| fmr | no | no | no | no | 1 |
| fneg | no | no | no | no | 1 |
| fabs | no | no | no | no | 1 |
| fnabs | no | no | no | no | 1 |
| fadd | yes | yes | yes | yes | 2 |
| fadds | yes | yes | yes | yes | 2 |
| fsub | yes | yes | yes | yes | 2 |
| fsubs | yes | yes | yes | yes | 2 |

TABLE 1-continued

| Instruction | FR | FI | C | FPCC | class |
| --- | --- | --- | --- | --- | --- |
| fmul | yes | yes | yes | yes | 2 |
| fnuls | yes | yes | yes | yes | 2 |
| fdiv | yes | yes | yes | yes | 2 |
| fdivs | yes | yes | yes | yes | 2 |
| fmadd | yes | yes | yes | yes | 2 |
| fmadds | yes | yes | yes | yes | 2 |
| fmaub | yes | yes | yes | yes | 2 |
| fmsubs | yes | yes | yes | yes | 2 |
| fnmadd | yes | yes | yes | yes | 2 |
| fnmadds | yes | yes | yes | yes | 2 |
| fnmsub | yes | yes | yes | yes | 2 |
| fnmsubs | yes | yes | yes | yes | 2 |
| frsp | yes | yes | yes | yes | 2 |
| fctid | yes | yes | yes* | yes* | 2 |
| fctidx | yes | yes | yes* | yes* | 2 |
| fctiw | yes | yes | yes* | yes* | 2 |
| fctiwz | yes | yes | yes* | yes* | 2 |
| fcfid | yes | yes | yes | yes | 2 |
| fcmpu | no | no | no | yes | 3 |
| fcmpo | no | no | no | yes | 3 |
| mffs | | | special | | |
| mcrfs | | | special | | |
| mtfsfi | | | special | | |
| mtfsf | | | special | | |
| mtfsb0 | | | special | | |
| mtfsb1 | | | special | | |
| fsqrt | yes | yes | yes | yes | 2 |
| fres | yes* | yes* | yes | yes | 2 |
| frsqrte | yes* | yes* | yes | yes | 2 |
| fsel | no | no | no | no | 1 |

In Table 1, a classification used by the methodology for updating the non-sticky status bits of FPSCR 324 is described for each type of instruction executed by FPU 210. Each of these instructions is a common floating point instruction. It should be remembered that non-sticky status bits of the FPSCR are those status bits which may be modified without maintaining history information from previous executed instructions. From Table 1, the non-sticky FPSCR bits are designated as "FR," "FI," "C," and "FPCC." The "FR" bit indicates whether a last arithmetic or rounding and conversion instruction that rounded the intermediate result incremented a fraction. The "FI" value indicates that the last arithmetic or rounding and conversion instruction either rounded the intermediate result to produce an inexact fraction or caused a disabled Overflow Exception. The "C" value is set in response to arithmetic, rounding, and conversion instructions to reflect a certain class of results. Lastly, the "FPCC" value is a floating-point condition code value. Floating-point compare instructions set one of the FPCC bits to a logic one value and the other three FPCC bits to zero, selectively. In one embodiment to the present invention, the high-order three bits of the FPCC retain their relational significance indicating that the value is less than, greater than, or equal to zero. For additional information on the non-sticky FPSCR bits, refer to *The Power PC™ Architecture: A Specification for a New Family of Risc Processors*, published by International Business Machines, Inc. and edited by Cathy May, et al., and published by Morgan Kaufmann Publishers, Inc., Pages 137 through 140, which is hereby incorporated by reference herein. Furthermore, as is illustrated in Table 1, each of the instructions has an associated class. It is this class which is determined by each of the plurality of instruction decode circuits 302 through 308. It should be noted that the classification of instructions is based upon the need to update the non-sticky FPSCR bit illustrated therein for a given floating point unit operation involving the associated instruction, as discussed hereinabove.

Thus, each of the plurality of instruction decode logic circuits 302 through 308 determines the classification of a floating point unit instruction dispatched to floating point unit 210. The classification, determined for each of the plurality of instruction decode logic circuits 302 through 308, indicates which non-sticky bits within FPSCR 324 should be updated during execution of the instruction. A state of these classification signals is saved as status information within the plurality of FPU instruction queues 326. The classification signals are used by non-sticky bit tag maintenance logic 325 to set "don't write" data values which are used along with the classification signals and instruction order to create update signals for the non-sticky classes. These update signals indicate which of a plurality of instructions simultaneously issued should update the non-sticky status. The update signals are piped with their respective instructions, as discussed hereinabove. Subsequently, when the instruction is removed from one of the plurality of FPU instruction queues 326 and issued, by FPU instruction issue logic 311, to one of FPU pipe0 312 and FPU pipe1 314, these update signals are sent to an appropriate FPU pipe. Once provided to one of FPU pipe0 312, FPU pipe1 314, the update signals are piped with the instruction down the execution pipeline and saved in FPSCR rename buffer 320, together with status information generated during execution of the instruction within one of the floating point pipes. It should be noted that status information is generated for an instruction executing within FPU pipe0 312 via pipe0 status circuit 316. Similarly, status information generated by an instruction executing within FPU pipe1 314 is generated by pipe1 status circuit 318. The update information, together with the status information is used to determine which executing instructions should update the FR, FI, C, and FPCC non-sticky bits within the working FPSCR, constituting working FPSCR P0 status 319, working FPSCR P1 status 321, and working FPSCR status merge logic 323. In addition, non-sticky FPSCR update information as determined in pipe0 status circuit 316 and pipe1 status circuit 318 are saved in rename buffer 320. In an embodiment of the present invention, these constitute the four completion control bits previously described. By determining whether or not the completing instruction updated these non-sticky bits, the architected FPSCR 324 value may be accurately calculated. Updating the non-sticky status of FPSCR 324 subsequently will be described in detail.

In addition to the "don't write" and non-sticky classification bits from an appropriate one of the plurality of instruction queues 326 to an appropriate execution pipe within FPU 210, at a time of issue, FPU issue logic 311 must also provide instruction program order data and generate update signals to the execution pipes. These update signals are used in FPU0 working FPSCR update logic 310 and FPU1 working FPSCR update logic 315 which generate control signals therefrom, and provide these signals, respectively, to pipe0 status circuit 316 and pipe0 status circuit 318. Pipe0 status circuit 316 and pipe1 status circuit 318 use the control signal to control updating non-sticky status bits in working FPSCR P0 status 319 and working FPSCR P1 status 321, respectively. The working FPSCR status data, sticky and non-sticky, is generated by merging the status data from working FPSCR P0 status 319 and working FPSCR P1 status 321 in working FPSCR status merge logic 323. FPSCR status merge logic 323 contains the accurate speculative status, and provides these to pipe0 status circuit 316 and pipe1 status circuit 318 in order that the status may be sourced by an FPSCR instruction.

During execution of instructions within FPU pipe0 312, pipeline data is provided to pipe0 status circuit 316. Similarly, during execution of an instruction within FPU pipe1 314, pipeline data is provided to pipe1 status circuit 318. Pipe0 status circuit 316 and pipe1 status circuit 318 receive this pipeline data to calculate the status of an instruction. Speculatively executing FPSCR instructions in FPU pipe0 312 may update FPSCR control bits and these are provided to working FPSCR control buffer 317. Control data in working FPSCR control buffer 317 is made available to FPU pipe0 312 and FPU pipe1 315 for controlling the execution of subsequent instructions. Recall that FPU issue logic 311 ensures that an FPU instruction following an FPSCR instruction is "in-order" with respect to the FPSCR instruction. If speculative execution is to be cancelled, or an exception occurs, the re-order buffer (not shown herein) issues a global-cancel signal to working FPSCR control buffer 317, and the architected FPSCR contents are moved to the working FPSCR, constituting working FPSCR P0 status buffer 319, working FPSCR P1 status buffer 321 and working FPSCR control buffer 317. The cancel signal is generated once the instruction causing the exception has completed, so the architected FPSCR is accurate as if all prior instructions have executed. Additionally, pipe 0 status circuit 316 and pipe 1 status circuit 318 generate exception reports that are supplied to the re-order buffer (not illustrated herein) as if all prior sticky status bits of the FPSCR value were zero. Since the re-order buffer processes such exceptions in instruction order, the interrupts for the earliest interrupting instruction will be taken. Subsequent instructions will be cancelled. As such, precise interrupts can be posted.

It should be noted that precise interrupts are typically used during a debug process to aide software designers and developers in debugging their software code. When an instruction is executed in an out-of order data processing system, it is possible for a break point to occur during execution of an instruction. In prior art systems, this could result in incorrect data being accessed from the FPSCR. However, with the present invention, the values stored within the re-order buffer indicate status associated with instruction interrupt. This status is then utilized to determine a correct FPSCR value in accordance with the teachings of the present invention.

The status information calculated by pipe 0 status circuit 316 and pipe 1 status circuit 318 is maintained in FPSCR rename buffer 320. The saved status value is the status for only that instruction. It should be noted that "independent" instructions are those instructions wherein the instruction is truly independent or its dependencies have been calculated and are available from either a floating point register or a floating point rename buffer. Only primary status information is saved in FPSCR rename buffer 320 in one embodiment of the present invention. Summary bits are not saved, but are regenerated from the primary bits upon instruction completion. It should be noted that summary bits reflect logical combinations of primary status bits. Examples of such summary bits are discussed in greater detail in *The Power PC™ Architecture: The Specification for a New Family of Risc Processors*, published by International Business Machines, Inc. and edited by Cathy May, et al. at Page 137, which is hereby incorporated by reference herein.

Furthermore, in addition to these primary status bits, the generated completion control bits previously discussed, are also retained in FPSCR rename buffer 320 to control the updating of the non-sticky bits during an FPSCR re-ordering operation. During an FPSCR re-ordering operation, FPSCR re-order logic 322 receives a completion control from the re-order buffer to indicate which floating point unit instructions are to be completed. FPSCR re-order logic circuit 322 then re-orders the status bits saved in FPSCR rename buffer 320 to generate the architecturally compliant FPSCR.

The re-ordering of the non-sticky bits of FPSCR 324 may be implemented in the present invention using a logic circuit disclosed in U.S. patent application Ser. No. 08/935,939, incorporated herein by reference, wherein the appropriate completion signals are used, as discussed hereinabove. Such a circuit is illustrated in greater detail in FIG. 4. As is illustrated in Table 1, non-sticky bits can be divided into separate classes and instructions for updating the non-sticky bits. In one embodiment of the present invention, the non-sticky bits can be divided into three classes of instructions. Through these classifications, the non-sticky bits may be updated under control of three update bits. Thus, from each port of FPSCR rename buffer 320 the FR, FI, C, and FPCC status bits, an update_FRFI (the FR and FI non-sticky status bits), an update_FPCC (the FPCC status bit), and an update_C (the C status bit) are provided. It should be noted that these signals are not separately labeled within FIG. 4 as to do so would unduly confuse the illustration of the logic circuitry described therein.

Since the bits to be re-ordered are non-sticky, the last instruction which completes that alters the status should be selected for updating FPSCR 324. If no instruction is completing that alters the non-sticky bits, then the status within FPSCR 324 is retained. Such result is obtained by gating the update bits, update_FRFIC, update_C, and update_FPCC, with the completion indicators from the re-order buffer using AND gates 402 through 416. The results of this gating operation is decoded for all ports to determine a latest completing instruction updating the status of the value stored within FPSCR 324 using NOR gates 418 through 432. The results of this decode operation are then used to select which of the values provided by the four ports, or the value provided by the architected FPSCR, should update the value stored within FPSCR 324 using AND gates 438 through 452 and OR gates 454 and 456. Re-order logic 322 for re-ordering sticky status is illustrated in FIG. 5. Re-ordering of sticky status bits depends on whether a completion slot in completion unit 458 contains an FPSCR instruction. If a completion slot contains an FPSCR instruction, it signals FPSCR re-order logic 322 by asserting a corresponding signal at an output of completion unit 458, which is then provided to one of the two inputs of a corresponding one of AND gates 502, 504, 506, and 508. The signal from completion unit 458 is used to gate through an FPSCR instruction signal from a corresponding port in rename buffer 320 to decoder 510. Recall that while all FPSCR instructions source the architected FPSCR 324, a subset of FPSCR instructions, referred to as FPSCR set instructions, can reset FPSCR sticky bits. If the instruction in rename buffer 320 is an FPSCR set instruction, then the FPSCR INSTR signal in the corresponding port of rename buffer 320 is asserted. If, however, the FPSCR instruction is not an FPSCR set instruction, the FPSCR INSTR signal at the corresponding port in rename buffer 320 is negated.

If a completion slot signals to FPSCR re-order logic 322 that it contains an FPSCR instruction, then re-order logic 322 ignores information in prior completion slots. Decoder 510 receives the outputs of AND gates 502, 504, 506, and 508 at a corresponding input. Decoder 510 outputs four signals. If all four input signals are negated, then each of the outputs of decoder 510 is asserted. If the first input of decoder 510, received from AND gate 502, is asserted, then the first output decoder 510 is negated and the remaining three outputs are asserted. If the third and fourth inputs to decoder 510 are negated, implying 1 and 2 are asserted, then the first and second outputs of decoder 510 are negated and the third and fourth outputs of decoder 510 are asserted. If only the fourth input to decoder 510, from AND gate 508, is negated, then the fourth output of decoder 510 is asserted, and the other three outputs are negated. Recall that, with respect to FPSCR instructions, FPU instructions are in instruction order. Also, recall that, with respect to each other, FPSCR instructions are in order. Thus, if two or more completion slots contain FPSCR instructions, those instructions are in-order with respect to each other, as well as with respect to other FPU instructions. The outputs of decoder 510 provide gating signals to AND gates 512, 514, 516, and 518, which then gate sticky status signals to the outputs of the respective AND gates. In this way, the sticky status in prior completion slots is ignored.

The sticky status from ports 1, 2, and 3 in rename buffer 320 are provided to second inputs of AND gates 514, 516, and 518, respectively. As previously described, these sticky status signals are gated through by the signals from the second, third, and fourth outputs of decoder 510. The sticky status from port 4 in rename buffer 320 is provided to an input of AND gate 520, and the second input of AND gate 520 receives the output of AND gate 508. Thus, if all four completion slots contain FPSCR instructions, in which case all outputs of decoder 510 are negated, the sticky status from port 4 is gated through AND gate 520, provided that the FPSCR instruction corresponding to port 4 is an FPSCR set instruction.

The architected FPSCR sticky status is generated by logically OR'ing the sticky status in rename buffer 320. The architected sticky status is provided at the output of OR gate 522. The sticky status in rename buffer 320 appear at the outputs of AND gates 514, 516, 518, and 520, which are provided as inputs to OR gate 522, in accordance with the gating signals provided to AND gates 514, 516, 518, and 520, as previously described.

If no FPSCR instruction occupies a completion slot, then the architected sticky status bit in FPSCR 324 is also logically OR'ed with the sticky status in rename buffer 320. Thus, no instruction in the current cycle might have reset sticky status, and the sticky status accurately represents a history of prior executing instructions. The architected sticky status appears at the output of AND gate 512, which is also provided to an input of OR gate 522. Recall that if no FPSCR instruction occupies a completion slot, then the first output of decoder 510 is asserted, and this signal is provided to one of the inputs of AND gate 512 which then gates through the architected sticky status from FPSCR 324. It should be remembered that only primary sticky status values are re-ordered and stored in FPSCR 324. Architected FPSCR control data values are re-ordered and stored in FPSCR 324 in exactly the same way as sticky status values. As previously mentioned, summary status bits may be derived from these primary status bits in a straightforward manner.

However, special operations must be performed to generate the FX bit. The FX bit is set if from the time of its being reset, one of the sticky status bits toggles from a logic "0" to a logic "1". To make this determination, each sticky status bit calculated a completion time must be compared to a corresponding reference bit to ascertain if the status toggles from a logic "0" to a logic "1". If no FPSCR instruction is completing, the reference bit is a sticky status in the architected FPSCR 324. This is gated through AND gate 512, as previously described, and provided to an input of OR gate 536. Moreover, if no FPSCR instructions are completing, the outputs of each of AND gates 502, 504, 506, and 508 are negated, because an input to each of these gates is negated. The output of AND gate 502, 504, and 506 are provided to an input of AND gate 524, 526, and 528, respectively. These, in turn, negate the output of the respective AND gate , 524 , 526 , and 528 . These, in turn, negate the output of AND gates 530, 532, and 534 as the outputs of AND gates 524, 526, and 528 form an input to each of AND gates 530, 532, and 524, respectively. Thus, the output of OR gate 536 is the architected sticky status value since the other three inputs of OR gate 536 are all negated, being the outputs of AND gates 530, 532, and 534, respectively.

If one or more completion slots include an FPSCR instruction, then the reference bit is the bit from the rename buffer for the last completing FPSCR instruction, unless all four completion slots contain FPSCR set instructions. The outputs of AND gates 502, 504, and 506 are provided to an input of AND gates 524, 526, and 528, respectively. The output of one of AND gates 524, 526, and 528 corresponding to a last completing FPSCR instruction is then asserted, provided that instruction sets an FPSCR bit. The sticky status for the instructions corresponding to port 1, port 2, and port 3 in rename buffer 320 are provided to an input of AND gates 530, 532, and 534, respectively. These sticky status values are gated through to the outputs of AND gates 530, 532, and 534 by gating signals provided by the output of AND gates 524, 526, and 528, respectively. The output of AND gates 524, 526, and 528 are negated for each of those gates corresponding to a slot later than the completing FPSCR slot by the negation of the corresponding output of AND gate 502, 504, and 506. The output of AND gates 524, 526, and 528 corresponding to completion slots prior to the last completing FPSCR instruction have their outputs negated by the corresponding output of decoder 510. In this way, only the sticky status in rename buffer 320 corresponding to the last FPSCR instruction completing is gated through the corresponding AND gate 530, 532, and 534 to OR gate 536. The sticky status in FPSCR 324 is negated at the output of AND gate 512 by the negation of the first output of decoder 510.

If all four completion slots contain a completing FPSCR instruction, either the last FPSCR set instruction did or did not reset the FX bit. In either circumstance, no instruction is completed following this last FPSCR set instruction and the re-order logic 322 calculation for the sticky is accurate at completion; there is no comparison to be made. In this case, all outputs of decoder 510 are negated, negating the outputs of AND gates 512, 524, 526, and 528, and, consequently, the outputs of AND gates 530, 532, and 534. The sticky status reference bit, at the output of OR gate 536 is then negated, since the reference bit is not required. For this case, the FX bit from the rename buffer is the FX for the completion. This is calculated from OR gate 522.

The foregoing description has provided one embodiment of the present invention. It should be noted that the logic for the disclosed mechanism has been described using an assumed CPU/FPU design. The explicit design described herein is representative of alternatives that may be included in the mechanism being disclosed and their dependence on the CPU/FPU design within which the mechanism is to be used. It should be noted that the description within the stated environment is by no means intended to limit the mechanism to the described characteristics. Adjustment of the mechanism to other CPU/FPU design constraints should be obvious to those skilled in the art. In addition, the partitioning of logic between cycles has been avoided in the present invention since this implementation is highly dependent upon the desired machine cycle time. Different partitioning of the logic may be created and still fall under the scope of this disclosure. Such partitioning of logic between cycles is a well-known tuning method to those experienced in the art of logic design.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system, comprising:
   input means for communicating a plurality of instructions;
   a register for storing a first plurality of status control values;
   a status logic circuit for selectively generating a first plurality of status values in response to the first one of the plurality of instructions; and
   a speculative status logic device coupled to said status logic circuit for receiving said first plurality of status values therefrom, and coupled to said register for receiving said first plurality of status control values therefrom, said speculative status logic device generating a second plurality of status control values, wherein said second plurality of status control values is provided to an input of said status logic circuit.

2. The data processing system of claim 1, wherein the first plurality of status control valued corresponds to a past plurality of status values generated in response to a previous one of the plurality of instructions.

3. The data processing system of claim 1, further comprising a control storage device coupled to said status logic circuit for providing a plurality of control values thereto, said register storing a first plurality of preselected control values, wherein said control storage device is coupled to said register to receive said first plurality of preselected control values.

4. The data processing system of claim 3, further comprising a completion circuit for providing a cancel signal to said control storage device, wherein said cancel signal terminates speculative instruction execution.

5. The data processing system of claim 1 further comprising a status logic update logic circuit coupled to said input means for communicating a plurality of instructions for receiving instruction order data values and update data values therefrom, wherein said update logic circuit provides an update signal to said status logic circuit.

6. The data processing system of claim 1 further comprising an update tag management logic coupled to said input means for establishing update tag data values tag data when a second instruction slips past a first instruction for execution.

7. The data processing system of claim 1 wherein said speculative status logic further comprises:
   first and second status buffers, said first status buffer being coupled to said status logic circuit for receiving said first plurality of status values therefrom, and said second status buffer being coupled to a second status logic circuit for receiving said second plurality of status values therefrom; and
   status merge logic coupled to said first and second status buffers for receiving said first and second plurality of status values and generating said second status control value therefrom.

8. The data processing system of claim 7, wherein the current status control value comprises a plurality of sticky bits.

9. The data processing system of claim 7, wherein the current status control value comprises a plurality of non-sticky bits.

10. The data processing system of claim 1 further comprising a re-order logic circuit for receiving a plurality of current status values from said status logic circuit and receiving said first plurality of status control values from said register, and generating at least one current status control value in response thereto.

11. The data processing system of claim 10, wherein said re-order logic circuit logically combines said plurality of current status values and said first plurality of status control value to generate said at least one current status control value during an interval when the out-of-order instruction is completing.

12. The data processing system of claim 1 wherein a portion of said plurality of instructions execute in a first execution pipe in de-serialized fashion.

13. The data processing system of claim 12 wherein a second portion of said plurality of instructions execute in said first execution pipe and a second execution pipe using out-of-order execution.

14. The data processing system of claim 12, wherein the interrupt means initiates a plurality of interrupt operations in response to a plurality of exception signals generated by said status logic circuit while a portion of the plurality of instructions is executing.

15. The data processing system of claim 14, wherein the re-order logic circuit generates said at least one current status control value to correspond to a last plurality of status values generated in response to a previous one of the plurality of instructions executed prior to initiation of a first one of said plurality of interrupt operations.

16. The data processing system of claim 1 further comprising:

interrupt means for initiating an interrupt operation in response to a first exception signal generated by said first status logic circuit in response to the said plurality of status values.

17. The data processing system of claim 1, further comprising an instruction decode circuit for decoding said plurality of instructions to provide a plurality of information signals.

18. The data processing system of claim 17, wherein said plurality of information signals indicate when a corresponding one of the plurality of instructions modifies one of a first non-sticky value and a second non-sticky value in said status control value stored in the register.

19. The data processing system of claim 17 comprising:

a rename buffer for storing the plurality of information signals.

20. The data processing system of claim 1, comprising:

a rename buffer for selectively storing the first plurality of status values for an out-of-order executing instruction.

21. A method for operating a data processing system, comprising the steps of:

communicating a plurality of instruction;

storing a plurality of status control values in a register;

speculatively generating a first plurality of status values in response to the first one of said plurality of instructions;

generating a current status control value in response to said first plurality of status values and the status control value;

generating one or more instruction status values for a currently executing instruction of said plurality of instructions; and logically combining said one or more instructions status values to generate an updated plurality of status control values during an interval when at least one speculatively executed instruction is completing.

22. A method for operating a data processing system, comprising the steps of:

communicating a plurality of instructions;

storing a plurality of status control values in a register;

speculatively generating a first plurality of status values in response to the first one of said plurality of instructions;

generating a current status control value in response to said first plurality of status values and the status control value;

generating one or more instruction status values for a currently executing instruction of said plurality of instructions; and logically combining said one or more instruction status values in said plurality of status control values to generate an updated plurality of status control values during an interval when no speculatively executed instruction is completing.

23. A data processing system comprising:

an instruction issue means;

a first floating point execution pipe coupled to said instruction issue means for receiving one or more instructions therefrom;

a second floating point execution pipe coupled to said instruction issue means for receiving one or more instructions therefrom;

a first pipe status circuit coupled to said first floating point execution pipe for determining instruction execution status;

a second pipe status circuit coupled to said second floating point execution pipe for determining instruction execution status;

a control data buffer coupled to said first and second pipe status circuits for providing control signals thereto;

a first pipe status buffer coupled to said first pipe status circuit for receiving speculative status data;

a second pipe status buffer coupled to said second pipe status circuit for receiving speculative status data; and a status merge logic coupled to said first and second pipe status buffers for merging said speculative status data from said first and second pipe status buffers.

* * * * *